Inventor
Louis Zaiger
by Heard Smith Tennant
Attorneys.

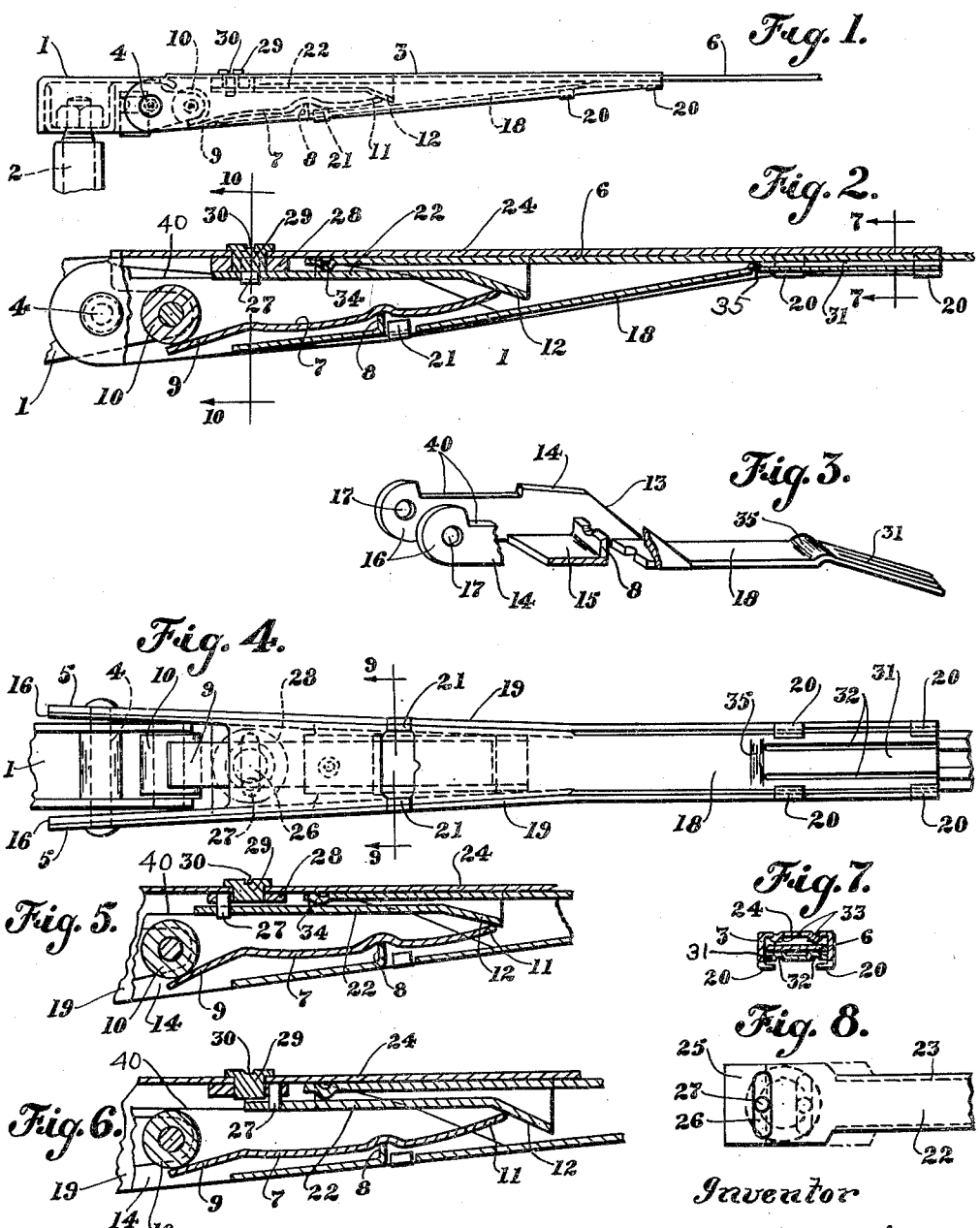

Patented Oct. 31, 1950

2,528,258

UNITED STATES PATENT OFFICE 2,528,258

WINDSHIELD WIPER ARM

Louis Zaiger, Swampscott, Mass.

Application October 11, 1945, Serial No. 621,721

9 Claims. (Cl. 15—250)

This invention relates to windshield wiper arms.

Such arms are commonly made with an inner member which is attached to the actuating shaft, an outer blade-carrying member which is pivotally connected to the inner member, and a spring device for biasing the outer member and providing the desired spring wiping contact pressure between the wiping blade and the windshield glass.

One object of the present invention is to provide an improved spring mechanism which is relatively simple in construction and which can be easily adjusted to apply a greater or less spring pressure of the wiping blade against the windshield glass.

The novel features of the invention will be more fully hereinafter set forth and then pointed out in the claims.

In the drawing wherein I have illustrated some selected embodiments of my invention, Fig. 1 is a side view of a portion of a windshield wiper arm embodied in my invention.

Fig. 2 is an enlarged sectional view.

Fig. 3 is a perspective view of the fulcrum member with parts broken out.

Fig. 4 is an underside view of Fig. 2.

Figs. 5 and 6 are fragmentary sectional views showing different positions of the cam by which the spring pressure is varied.

Fig. 7 is a section on the line 7—7, Fig. 2.

Fig. 8 is a fragmentary view illustrating the means for adjusting the cam that controls the spring pressure.

Figure 9:
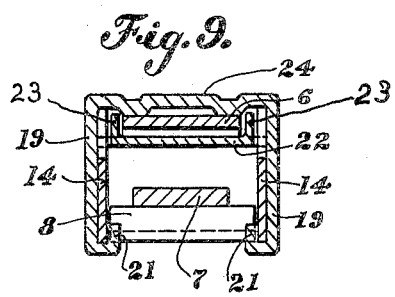
Fig. 9 is an enlarged section on the line 9—9, Fig. 4.
Figure 10:
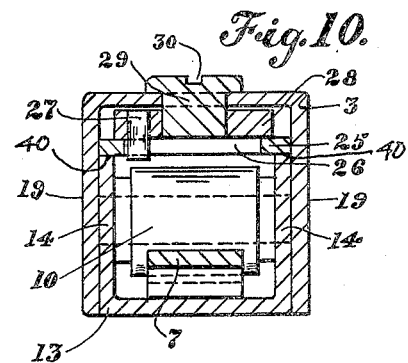
Fig. 10 is an enlarged section on the line 10—10, Fig. 2.

The wiper herein illustrated comprises an inner section 1 which is rigidly attached to the operating shaft 2 and an outer section 3 having a channel shape which is pivoted to the inner section by the pivot pin 4 as usual in windshield wiper-arms, said outer section having at its inner end the two ears or extensions 5 which embrace the end of the inner member and through which the pivot pin 4 extends. The outer section 3 is provided with an extensible blade-carrying member 6 to the end of which the wiper blade (not shown) is secured.

In windshield wiper arms of this type it is customary to provide a spring element which biases the outer section 3 and provides the desired spring pressure of the wiper blade against the windshield glass. In the present invention this spring member is a leaf spring 7 which is fulcrumed intermediate of its ends on a fulcrum member carried by the outer section 3, the inner end 9 of the leaf spring 7 bearing against a roll 10 which is carried by the outer end of the inner section 1, and the outer end 11 of said spring bearing against an adjustable cam element by which the flexure or bias action of the spring 7 may be varied.

In the construction shown in Figs. 1–6, the fulcrum member is indicated at 8 and is formed on an inner casing element 13 which is received between the side walls 19 of the channel shaped outer arm section 3. Said inner casing is formed with two side walls 14 and the connecting back wall 15, said member thus having a channel shape. The back wall 15 is slit and a portion 8 thereof is bent up at right angles thereto thereby providing the fulcrum member.

The side walls 14 extend inwardly beyond the back wall 15 as indicated at 16 and the portions 16 of the inner casing member 13 are provided with apertures 17 through which the pivot pin 4 extends thereby anchoring the inner end of the inner casing 13 to the outer section 3.

The back wall 15 of the inner section 13 extends outwardly beyond the side walls 14 as shown at 18 and this extension 18 is received between the outer portions of the side walls 19 of the outer section 3 and is held in place by tabs 20 formed on the side walls 19 which are bent over inwardly to overlie the extension 18 as best seen in Fig. 4. Each side wall 19 is also shown as having another tab 21 which is bent over the back edge of the corresponding side wall 14 of the inner casing 13 at the point where the fulcrum member 8 is struck up, said tabs 21 serving as a further means for firmly anchoring said inner section 13 in place.

The cam element, shown at 12, which bears against the outer end 11 of the spring 7 is mounted within the outer arm section 3 and is adjustable to vary the flexure of the spring 7. In the construction shown in Figs. 1–6 this adjustment is secured by moving the cam longitudinally of the arm section 3. When the cam element is in the position shown in Fig. 6, it bears against the end 11 of the spring 7 with a minimum pressure and therefore, the spring will have a relatively light biasing action on the outer arm section 3. When the cam element is moved to the left into the position shown in Fig. 5, it applies an increased pressure against the outer end 11 of the spring 7 thereby flexing said spring and causing the inner end 9 thereof to bear with increased pressure against the roll 10. When the parts are in this position, the spring will have an increased biasing action.

The cam element 12 is provided with a shank or stem portion 22 having at each side a flange 23 which rests against the front face 24 of the outer arm section 3. The inner end 25 of the shank 22 is shown as widened somewhat and is provided with a transverse slot 26 in which is received a crank pin 27 depending from a disk 28 which is located on the inside of the front wall 24 of the outer arm section 3 and which has a stud 29 rigid therewith that extends through said wall and is provided with a screw driver slot 30. The crank pin 27 is eccentrically carried by the disk 28, and as a result, when the stud 29 and disk 28 are turned, the crank pin 27 operating in the slot 26 will move the shank 22 and the cam member 12 longitudinally of the wiper arm.

Fig. 5 shows the parts positioned with the crank pin 27 at the extreme inner end of its throw, while Fig. 6 shows the disk 28 and stud 29 positioned with the crank pin 27 at the outer end of its throw.

Inasmuch as the stud 29 projects through the front wall of the outer arm section 3, the screw driver slot 30 will be at all times accessible to receive a screw driver or other implement for making any necessary or desired adjustment in the position of the cam 12.

Figure 12:
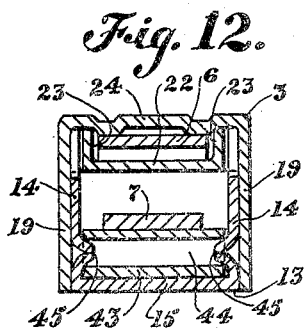
Fig. 12 is a section on the line 12—12, Fig. 11.

The shank 22 of the cam element is received between the side walls 14 of the inner casing member 13 and is guided thereby as seen in Fig. 12. The end 25 of the shank in which the slot 26 is formed is, as stated above, wider than the body of the shank, said widened end 25 extending from one side wall 19 of the outer arm section to the opposite side wall. The side walls 14 of the inner casing member 13 are cut away as indicated at 40 to receive the side edges of the widened portion 25 of the shank 22. Said inner widened end 25 of the cam element is thus held in position by the side walls 14 of the inner casing section where they are cut away as at 40, and the outer end of said cam element is retained in position by its engagement with the end 11 of the spring 7.

Figure 11:
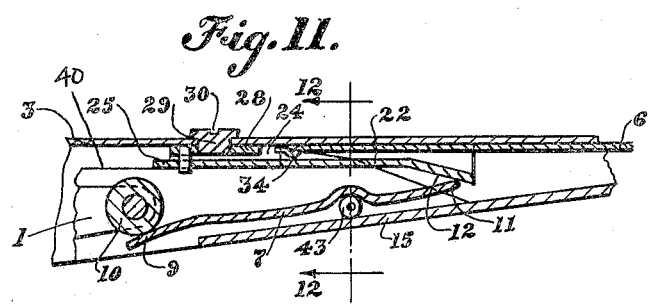
Fig. 11 is a sectional view showing a modified form of the invention.

In Figs. 11 and 12 I have illustrated a different form of the invention wherein the fulcrum member is in the form of a cylinder 43 which rests on the back wall 15 of the inner casing section 13. This cylindrical fulcrum member 43 may be retained in position in any approved way. As herein shown, said member is provided with a central bore 44 and a portion of the walls 14 of the inner casing section 13 are bent inwardly into the ends of the bore 44 as shown at 45.

The inner end of the extensible blade-carrying portion 6 of the outer arm section 3 is received between the outer end 31 of the extension 18 and the front wall 24 of the outer arm section 3. Such outer end 31 of the extension 13 is provided on its inner face with two ribs 32 on which the extension 6 rests, and I will also preferably form two ribs 33 on the inner side of the front wall 24 of the outer arm section so that the extensible part 6 is confined between two pairs of ribs 32, 33. The advantage of this construction is that it reduces the danger of the part 6 sticking or binding and it facilitates the adjustment of said part.

The inner end of the member 6 is deformed to present a protuberance 34 and the extension 18 of the inner casing 13 is also deformed to present a stop rib 35. The engagement of the protuberance 34 on the extension 6 with the rib 35 serves to limit the extending movement of the part 6 and prevents it from being entirely withdrawn from the outer arm section 3.

I claim:

1. A windshield wiper arm comprising an inner shaft-engaging section, an outer channel blade-carrying section pivoted to the inner section, a fulcrum member carried by the outer section, a leaf spring extending longitudinally of said outer section and having its median portion loosely resting on said fulcrum member, the inner and outer ends of said spring being free and located on opposite sides of said fulcrum member, the inner end of said spring bearing against a part of the inner shaft-engaging section, a cam element carried by the blade-carrying section and bearing against the outer end of the spring, and means to adjust the cam to vary the pressure thereof against the outer end of the spring thereby to vary the flexure of the spring over the fulcrum member and consequently the spring pressure for the wiping contact of a blade carried by said outer blade-carrying section.

2. A windshield wiper arm comprising an inner shaft-engaging section, an outer channel blade-carrying section pivoted to the inner section, a fulcrum member carried by the outer section, a leaf spring fulcrumed intermediate of its ends on said fulcrum member, the inner end of the spring bearing against a part of the inner section, a sliding cam element mounted on the outer blade-carrying section and having a shank portion and a cam portion at one end of the shank portion, which cam portion bears against the outer end of said spring, and means to adjust the cam element longitudinally of the blade-carrying section thereby to vary the flexure of the spring over the fulcrum member and consequently the spring pressure for the wiping contact of a blade carried by said outer section.

3. A windshield wiper arm comprising an inner shaft-engaging section, an outer channel blade-carrying section pivoted to the inner section, a fulcrum member carried by the outer section, a leaf spring fulcrumed intermediate of its ends on said fulcrum member, the inner end of the spring bearing against a part of the inner section, a sliding cam element mounted on the outer blade-carrying section and having a shank portion and a cam portion at one end of the shank portion, which cam portion bears against the outer end of said spring, and means accessible from the front of the outer section to adjust the cam element longitudinally thereof thereby to vary the flexure of the spring over the fulcrum member and consequently the spring pressure for the wiping contact of a blade carried by said outer section.

4. A windshield wiper arm comprising an inner shaft-engaging section, an outer channel blade-carrying section pivoted to said inner section, a fulcrum member stationarily carried by the outer section, a leaf spring extending longitudinally of said outer section and having its median portion resting loosely on said fulcrum member, the inner and outer ends of said spring being free and located on opposite sides of said fulcrum member, the inner end of the spring bearing against a part of said inner shaft-engaging section, a member carried by the outer blade-carrying section and bearing against the outer end of the spring, and means accessible from the front of said outer blade-carrying section to vary the pressure of said member against the outer end of the spring thereby to vary the flexure of said spring over the fulcrum member and consequently the spring pressure for the wiping contact of a blade mounted on said outer blade-carrying section.

5. A windshield wiper arm comprising an inner shaft-engaging section, an outer channel blade-carrying section pivoted to the inner section, an inner casing member situated within the channel of the outer arm section and provided with a stationary fulcrum member, a leaf spring located within the inner casing section and fulcrumed intermediate of its ends on said fulcrum member, the inner and outer ends of the spring being on opposite sides of the fulcrum member and the inner end of the spring bearing against a part of the inner section, a cam element mounted on the outer blade-carrying section and bearing against the outer end of the leaf spring and means to adjust the cam longitudinally of the outer section thereby to vary the flexure of the spring over the fulcrum member and consequently the spring pressure of the wiping contact of a blade carried by said outer section.

6. A windshield wiper arm comprising an inner shaft engaging section, an outer channel blade-carrying section pivoted to the inner section, an inner channel casing member situated between the side walls of the outer arm section and having its open side facing in a direction opposite to that of the channel outer arm section, a fulcrum member carried by the inner casing member, a leaf spring located within said casing member and fulcrumed intermediate of its ends on said fulcrum member, the inner end of said spring bearing against a part of the inner arm section, a slide situated within the casing member and having at its outer end a cam portion bearing against the outer end of the spring, each side wall of the casing member being cut away adjacent its inner end, said slide having a wide inner end, the edges of which overlie the side walls of the casing member where they are cut away whereby said slide is held in place by the casing member, and means to adjust the slide with its cam portion thereby to vary the pressure of the spring against said part of the inner arm section.

7. A windshield wiper arm comprising an inner shaft-engaging section, an outer channel blade-carrying section pivoted to the inner section, an inner channel casing member situated between the side walls of the outer arm section and having its open side facing in a direction opposite to that of the channel outer arm section, a fulcrum member carried by the inner casing member, a leaf spring located within said casing member and fulcrumed intermediate of its ends on said fulcrum member, the inner end of said spring bearing against a part of the inner arm section, a slide situated within the casing member and having at its outer end a cam portion bearing against the outer end of the spring, each side wall of the casing member being cut away adjacent its inner end, said slide having a wide inner end provided with a transverse slot, the edges of said wide inner end overlying the side walls of the casing member where they are cut away, a crank disk carried by the front wall of the outer arm section, a crank pin carried by said disk and operating in said slot, and means accessible from the outside of the wiper arm for turning the crank disk thereby to adjust the slide longitudinally of the wiper arm.

8. A windshield wiper arm comprising an inner shaft-engaging section, an outer channel blade-carrying section pivoted to the said inner section, an inner channel casing member situated between the side walls of the outer arm section and provided with a fulcrum member, a leaf spring located within the casing section and fulcrumed intermediate of its ends on said fulcrum member, the inner end of the spring bearing against a part of the inner section, a cam element mounted on the outer blade-carrying section and bearing against the outer end of the leaf spring, means to adjust said cam thereby to vary the flexure of the spring over the fulcrum member, the back wall of the inner casing member being extended and located between the side walls of the outer arm section, and an extensible arm section having its inner end confined between the front wall of the outer arm section and said extension of the back wall of the casing member, the opposite faces of the outer arm section and casing member extending between which the arm extension is located, both being provided with ribs bearing against said arm extension.

9. A windshield wiper arm comprising an inner shaft-engaging section, an outer channel blade-carrying section pivoted to the inner section, a fulcrum member carried by the outer section, a leaf spring fulcrumed intermediate of its ends on said fulcrum member, the inner and outer ends of the spring being on opposite sides of the fulcrum member and the inner end of the spring bearing against a part of the inner section, a cam element mounted on the blade-carrying section and engaging the outer end of the leaf spring, and means to move the cam element longitudinally of said outer arm section thereby to vary the flexure of the spring.

LOUIS ZAIGER.

REFERENCES CITED

The following references are of record in the file of this patent:

UNITED STATES PATENTS

| Number | Name | Date |
|---|---|---|
| 2,289,552 | Rousseau | July 14, 1942 |
| 2,326,402 | Smulski | Aug. 10, 1943 |
| 2,353,208 | Whitted | July 11, 1944 |

FOREIGN PATENTS

| Number | Country | Date |
|---|---|---|
| 558,640 | Great Britain | Jan. 13, 1944 |